Dec. 15, 1959  J. D. LANGDON  2,917,070
SIPHONLESS TRAP
Filed Jan. 22, 1957

INVENTOR
J. D. Langdon 2,917,070
Patented Dec. 15, 1959

2,917,070

SIPHONLESS TRAP

Jesse D. Langdon, Long Beach, Calif.

Application January 22, 1957, Serial No. 635,459

5 Claims. (Cl. 137—247.15)

This application is a continuation in part of Ser. No. 339,149, filed Feb. 26, 1953, now abandoned, in turn copending with and continuing from parent Pat. 2,630,874; all relating to diaphragm valved types of the invention.

The primary object of the invention is to combine check valve means together with a valve body having an inlet and outlet permitting free flow of fluid in one direction under normal pressure conditions emanating from the inlet to be exhausted thru the outlet, together with means to prevent the egress of fluid from the outlet side when a negative pressure exists therein and including means to prevent the backflow of fluid from the outlet toward the inlet when a greater positive pressure exists within the outlet.

Other objects and purposes will appear during progress of the specification and recitation of the operation of the device constituting the invention described as illustrated by the drawing showing only one form of reduction to practice.

It is specifically understood that the invention is not limited to the reduction to practice shown, which may be changed within the scope of the claims.

Figure 1:
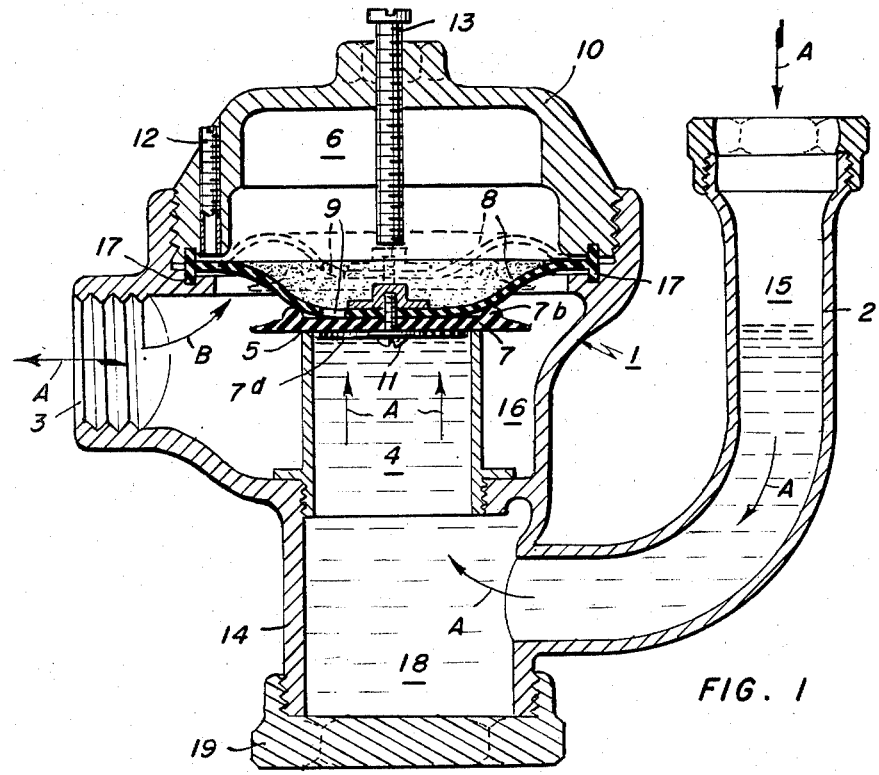
Fig. 1 is a vertical median section of the invention intersecting the casing thru the inlet, outlet and all active valve elements of the device being shown in normal position of rest.

The elements, their purpose and structural detail of the invention as indicated by designating characters include:

1 casing having an inlet 2 and an outlet 3, arrow A showing normal direction of pressure fluid flow; arrow B showing direction of backflow pressure. 4 upstanding intermediate passage. 5 intermediate passage seat. 6 pressure chamber. 7 disc-like valve member normally closing intermediate passage 4 and provided with a bead 7b resting against diaphragm 8 of deformable material, said disc-like member normally closing passage 9 provided thru diaphragm 8 for communicating between outlet 3 and pressure chamber 6 enclosed by cap 10. A screw 11 threaded into a washer 8d located on the upper side of the diaphragm 8 and securing the disc-like valve member 7 together with the diaphragm 8. An adjustable bypass tube 12 is inserted thru the cap 10 and communicates between pressure chamber 6 and atmosphere, the lower end of the tube being spaced away from and closely adjacent the periphery and inner face of the diaphragm 8, tube 12 admitting atmosphere to enter chamber 6 and being adjustable to compensate for permanent deformation and stretching of said diaphragm under use. An adjusting screw 13 is extended thru the center of the cap 10 for contacting the washer 8d to limit the opening of the valve. 14 is a sump formed by the lower portion of the upstanding passage 4. The annular passage 16 is a continuous portion of the outlet passage 3. The diaphragm 8 is provided with a peripheral anchor bead extended into annular grooves formed in the cap 10 and body of the casing 1. Sump 18 is closed by cap nut 19 threadedly attached to extension 14 to provide cleanout means for the sump 18.

The functional operation of the device is supported by the elements comprising the invention as follows:

Fluid under pressure greater than atmosphere entering thru inlet 2 flows thru outlet 3 via the intermediate upstanding passageway 4 provided with a seat 5 normally closed by the disc-like valve member 7 in conjunction with the diaphragm 8 forming a partition between the pressure chamber 6 and annular passage 16 surrounding the upper portion of intermediate passage 4. The major portion of the area of diaphragm 8 is exposed to fluid pressure existing in the annular passage 16 communicating with outlet passage 3. The diaphragm 8 being secured together with disc-like valve member 7 by valve joining element 11 permitting the diaphragm to flex away from the peripheral portion of the disc 7 which may be made of either rigid or preferably deformable material and may be extended radially outward of seat 5 to any extent desirable so long as the periphery is free to be urged away from diaphragm 8 and when provided, open passage 9 through diaphragm 8 to permit pressure fluid from outlet 3 to enter chamber 6.

The open position of the valve members formed by disc 7 and diaphragm 8 is shown by dotted lines Fig. 1.

Figure 2:
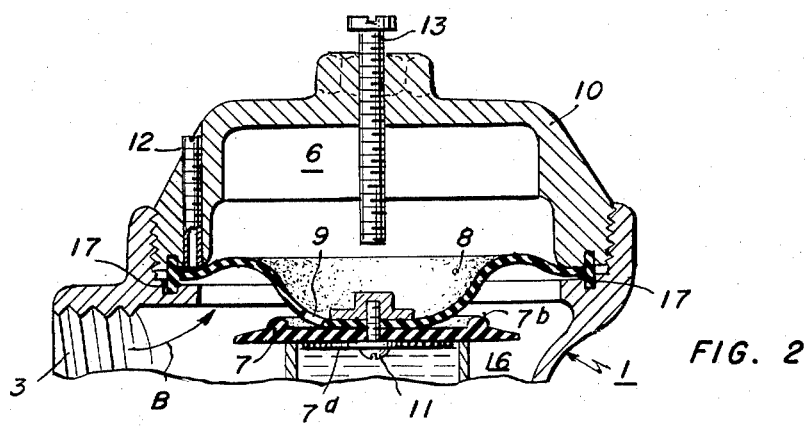
Fig. 2 is a fragmental section taken in the same direction as Fig. 1 showing the valve closed by pressure emanating from the outlet of the valve casing.

Fig. 2 shows the approximate position of disc 7 when first seated against the seat 5 by deformation of diaphragm 8 when subjected to pressure emanating from the outlet 3 as indicated by arrow B. Back-pressure through outlet 3 is effective between and against the diaphragm 8 and the beveled edge of the disc-like member 7 to urge the diaphragm 8 to arch upwardly and separate from the outer area of member 7, above the annular passage 16 at the same time closing the bypass 12 and compressing the contents of the air chamber 6 effective to raise that portion of the area of the diaphragm 8 that faces the annular passage 16 and urge the axial portion of said diaphragm together with disc 7 against the seat 5 closing the passage 4 against the egress of pressure fluid toward the inlet 2 thereby containing any liquid in the upstanding passages 4 and 15. When bypass passage 9 is provided, fluid pressure emanating from the outlet 3 greater than that of inlet 2 enters chamber 6, effective to urge diaphragm 8 together with valve member 7 against seat 5.

The device comprised by the invention has been proven operable without either the passage 9 or bypass 12 when both the diaphragm 8 and the disc 7 are made of soft suitably deformable material; in which case under the effects of sufficient pressure entering from outlet 3, diaphragm 8 is bulged upward as shown by Fig. 2; the center of diaphragm 8 being urged downwardly together with disc 7 which is flexed toward the seat 5 by a pressure head effective in the direction indicated by arrow B, the pressure emanating from outlet 3 effective in the space between the disc 7 and diaphragm 8 to urge the outer edge of disc 7 away from the adjacent portion of diaphragm 8 even in the absence of bypass passage 9 or tube 12, a lower pressure existing in the upstanding passage 4 than that in the outlet 3.

The invention is genericaly defined as follows:

A siphonless trap comprising a casing 1 provided with an inlet 2 having a continuous upstanding passage leg 15 communicating with an intermediate passage 4 surrounded by an annular passage 16 continuous with an outlet 3 provided for said casing 1, same adapted to be attached to interrupt a conduit pipe line, the intermediate passage 4 continuous with the inlet being normally closed by a disc-like valve member 7 of less area than and axially secured to a diaphragm 8 made of deformable material capable of being flexed away from the outer edge of and permit the disc 7 to close said upstanding passage 4, said diaphragm 8 forming a partition between said annular passage 16 and an oppositely disposed pressure chamber 6; whereby, greater pressure existing in said outlet 3 and said annular passage 16, being continuous with, permits pressure fluid emanating from said outlet 3, effective against the proximate surface of and to urge said diaphragm 8 to compress the contents of said pressure chamber 6, effective to urge the axis of said diaphragm and said disk 7 toward and against seat 5 provided by the upper end of intermediate passage 4 and thereby closing said intermediate passage 4 when a lesser condition of pressure exists in said upstanding intermediate passage 4 closed by said disc 7 same containing any liquid in the upstanding inlet passage 15 provided for said inlet 2 and a sump 18 formed by the lower portion of said intermediate passage 4.

Having described the construction and operation of the invention, the following claims are made:

1. A siphonless trap comprising a casing having inlet and outlet ends, passage means communicating between the two ends, and adapted to contain a liquid seal, the inlet passage terminating in a valve seat inside of said casing, a valve member adjacent the seat and being concomitant a diaphragm made of deformable material located between said valve member and a pressure chamber, said diaphragm separating said pressure chamber from said passage means communicating between said two ends, said diaphragm having more area exposed to the outlet passage than that area of said diaphragm concomitant said valve member, the area of the inlet passage surrounded by said valve seat being less than the area of said outlet passage exposed to said diaphragm, whereby, more pressure existing in said outlet passage than the pressure within said inlet passage, effective against the greater area of said diaphragm compressing any fluid in said pressure chamber thereby urging that portion of said diaphragm concomitant said valve member toward said valve seat to close said inlet passage.

2. A siphonless trap as defined by claim 1 comprising a casing provided with an inlet forming a passageway having an inner end opening terminating in a valve seat and an outlet forming a passageway terminating in an inner end opening of greater area than said inner end opening of said inlet passage, the inner ends of both passage openings facing the diaphragm of deformable material intervening between said both passage openings and a pressure chamber located on that side of said diaphragm that is opposite the inner ends of both passages, a valve member secured to that portion of said diaphragm that is opposite said valve seat and being provided with a portion separable from said diaphragm, whereby, when a positive pressure exists in said outlet passage and a negative pressure exists in said inlet passage, a fluid content being provided in said pressure chamber, pressure emanating from said outlet effective against a greater area of said diaphragm than that exposed to the inner end opening of said inlet, urges that area of said diaphragm exposed to said outlet passage toward said pressure chamber compressing the content of said pressure chamber, thereby urging that portion of said diaphragm that is secured to said valve member toward the seat, a portion of said diaphragm being adjacent to and separable from the unsecured portion of said valve member by the impact of pressure fluid emanating from said outlet effective to separate said diaphragm from and further urge said valve member to said seat.

3. A device as defined by claim 2 wherein an adjustable tube for communicating with atmosphere is provided extended through a part of the casing enclosing said pressure chamber and adjacent to and inside the periphery of the diaphragm, said adjustable tube being spaced away from said diaphragm, whereby atmosphere is permitted to enter the pressure chamber via said adjustable tube under one condition of pressure, said diaphragm closing said adjustable tube under another condition of pressure, the tube being adjustable to compensate for permanent deformation and stretching of said diaphragm resulting from use.

4. A device as defined by claim 2 wherein the valve member under one condition of pressure is arranged to close a bypass passage provided through the diaphragm and communicating with said pressure chamber, said diaphragm being separable from said valve member under another condition of pressure over that area of said diaphragm surrounding said bypass, whereby said another condition of pressure emanating from the outlet effective between the adjacent separable surfaces of said diaphragm and said valve member, serves to urge said diaphragm and the separable portion of said valve member apart, opening said bypass passage, thereby permitting pressure fluid to enter said pressure chamber and balance the pressure on both sides of said diaphragm further urging said valve member to seat.

5. A device as defined by claim 2 wherein the peripheral portion of the valve member is beveled away from the diaphragm to permit a velocity head of fluid pressure emanating from said outlet to strike between and urge the peripheral portion of said valve member and the adjacent portion of said diaphragm apart, fluid pressure effective on that side of said valve member facing said diaphragm to urge said valve member against the seat, closing said inlet passage against fluid pressure egress.

References Cited in the file of this patent

UNITED STATES PATENTS

| | | |
|---|---|---|
| 419,219 | Rosenfield | Jan. 14, 1890 |
| 473,993 | Anderson | May 3, 1892 |
| 2,381,287 | Iler | Aug. 7, 1945 |
| 2,707,481 | McPherson | May 3, 1955 |